US012739615B2

(12) United States Patent
Ogawa

(10) Patent No.: US 12,739,615 B2
(45) Date of Patent: Sep. 15, 2026

(54) INFORMATION PROCESSING METHOD, INFORMATION PROCESSING APPARATUS AND STORAGE MEDIUM STORING PROGRAM

(71) Applicant: SORACOM, INC., Tokyo (JP)

(72) Inventor: Muneaki Ogawa, Tokyo (JP)

(73) Assignee: SORACOM, INC., Tokyo (JP)

( * ) Notice: Subject to any disclaimer, the term of this patent is extended or adjusted under 35 U.S.C. 154(b) by 319 days.

(21) Appl. No.: 18/627,790

(22) Filed: Apr. 5, 2024

(65) Prior Publication Data

US 2024/0334175 A1 Oct. 3, 2024

Related U.S. Application Data

(63) Continuation of application No. PCT/JP2022/036849, filed on Sep. 30, 2022.

(30) Foreign Application Priority Data

Oct. 13, 2021 (JP) ................................ 2021-168031

(51) Int. Cl.
*H04W 8/18* (2009.01)
*H04W 60/00* (2009.01)

(52) U.S. Cl.
CPC ........... *H04W 8/183* (2013.01); *H04W 60/00* (2013.01)

(58) Field of Classification Search
CPC ....... H04W 8/18; H04W 8/183; H04W 52/02; H04W 60/00; H04W 60/06; Y02D 30/70
See application file for complete search history.

(56) References Cited

U.S. PATENT DOCUMENTS

2015/0341889 A1 11/2015 Starsinic et al.
2016/0066333 A1 3/2016 Suzuki et al.
2017/0195822 A1 7/2017 Watfa et al.
2017/0251328 A1* 8/2017 Klein ...................... H04W 4/06
2022/0046408 A1* 2/2022 Kang .................... H04L 63/102
(Continued)

FOREIGN PATENT DOCUMENTS

JP 2016-506694 A 3/2016
JP 2017-519454 A 7/2017
(Continued)

OTHER PUBLICATIONS

WO2023/063126A1, International Search Report and Written Opinion, Apr. 20, 2023.

*Primary Examiner* — William G Trost, IV
(74) *Attorney, Agent, or Firm* — WCF IP

(57) ABSTRACT

In the present disclosure, an apparatus 200 first receives, from a subscriber terminal 210, a first setting value A of a parameter used in a power consumption state. Next, the apparatus 200 transmits, to an HSS 230, a setting request for storing a second setting value B which differs from A, and then transmits CLR, including a re-attach designation, to an MME 220. The MME 220 transmits a detach request to the subscriber terminal 210, re-attaches, and then issues a notification to that effect. The notification includes a third setting value C, determined by the MME 220, for the parameter. The apparatus 200, having received a re-attachment completion notification, receives C from the subscriber terminal 210, and uses A, B, and C to assess the determination procedure.

10 Claims, 4 Drawing Sheets

(56) References Cited

U.S. PATENT DOCUMENTS

| | | | | |
|---|---|---|---|---|
| 2023/0292287 | A1* | 9/2023 | Ceendhralu | H04W 68/12 |
| 2023/0379691 | A1* | 11/2023 | Dhiman | H04W 4/12 |

FOREIGN PATENT DOCUMENTS

| | | | | |
|---|---|---|---|---|
| JP | 2019-029912 | A | 2/2019 | |
| WO | 2014/184834 | A1 | 11/2014 | |
| WO | WO-2022211470 | A1 * | 10/2022 | H04W 72/21 |

* cited by examiner

INFORMATION PROCESSING METHOD, INFORMATION PROCESSING APPARATUS AND STORAGE MEDIUM STORING PROGRAM

CROSS-REFERENCE TO RELATED APPLICATIONS

The present application is a continuation application of International Application number PCT/JP2022/036849, filed on Sep. 30, 2022, which claims priority under 35 U.S.C § 119(a) to Japanese Patent Application No. 2021-168031, filed on Oct. 13, 2021, contents of which are incorporated herein by reference in their entirety.

BACKGROUND OF THE INVENTION

The present disclosure relates to an information processing method, an information processing apparatus, and a storage medium storing a program for managing configuration of a wireless communication service provided using a wireless communication infrastructure of an MNO.

There are a large number of wireless access technologies for IoT devices due to an increasing demand for wireless connectivity of various devices to an IP network such as the Internet. The 3GPP (Registered Trademark), a standards organization for wireless communications, developed the LTE-M and NB-IoT as standards based on LTE technology for cellular Low Power Wide Area (LPWA) which are now in commercial use.

Low-power consumption has been generally desired in IoT devices, and, for cellular LPWA, the 3GPP standardized the Power Saving Mode (PSM) in Release 12, and the extended Discontinuous Reception (eDRX) in Release 13.

In the PSM, a hibernate state is defined as a state of an IoT device, in addition to a connected (RRC_CONNECTED) state and an idle (RRC_IDLE) state. In the hibernate state, the minimum information collection performed in the idle state, such as paging reception and neighboring cell search are not performed, and power consumption is suppressed by switching off a power supply of a circuit used for information collection, such as an RF circuit or a baseband circuit. It is possible to set a first period Tactive that starts when an IoT device enters the idle state and continues until it transitions to the hibernate state and a second period Tpsm that starts when an IoT device enters the idle state and continues until it exits from the hibernate state. When the second period Tpsm has elapsed or when an IoT device wants to resume communication, the IoT device in the hibernate state performs a Tracking Area Update (TAU), which is a procedure of updating location information of the device, stored in a Mobility Management Entity (MME).

Under the current specifications, the second period Tpsm can be set for up to 310 hours.

With the eDRX, it is specified that power consumption in the idle state is suppressed by temporarily switching off a power supply of a circuit such as an RF circuit or a baseband circuit, after the first period Tptw has elapsed from a certain point in time, and until a second period Tedrx elapses from that same certain point in time. Under the current specifications, the second period Tedrx can be set for up to 10485.76 seconds. It should be noted that the subscript of Tptw is an acronym of "paging time window."

It is possible to suppress power consumption in an IoT device by using functions compliant with the PSM and eDRX standards, but a subscriber of a wireless communication service used by the IoT device may want to set a desired value for each of the above-described periods according to the respective needs.

However, a value of a parameter ultimately set for an IoT device varies depending on a policy of each carrier, that is, a Mobile Network Operator (MNO), and is determined by a facility included in a wireless communication infrastructure of the MNO. Therefore, the policy is unknown to a mobile virtual network operator (see FIG. 1) such as a Mobile Virtual Network Operator (MVNO) and a Virtual Mobile Network Operator (VMNO) that provide a wireless communication service for accessing an IP network such as the Internet using a wireless communication infrastructure of an MNO. If a Mobile Virtual Network Enabler (MVNE), which provides a support service for smooth operation of an MVNO or a VMNO, intervenes between the MNO and the MVNO or VMNO, the policy is similarly unknown to the MVNE.

BRIEF SUMMARY OF THE INVENTION

The present disclosure focuses on this point, and an object thereof is to determine what decision procedure is used in an MNO for values of one or more parameters used in a low-power consumption state in an information processing method, an information processing apparatus, and a storage medium storing a program for managing configuration of a wireless communication service provided using a wireless communication infrastructure of an MNO.

Under the current specifications, it should be noted that states for reducing power consumption include an idle state and a hibernate state, and two different parameter values or timer values can be set for each state, but the states include those defined by future specifications, which are more generally referred to as a "low-power consumption state" herein.

An information processing method of a first aspect of the present disclosure is an information processing method, executed by a server, for managing configuration of a wireless communication service provided using a wireless communication infrastructure of an MNO, the method includes requesting a subscriber information database to be configured to store a second setting value, which is different from a first setting value of a parameter stored in a subscriber terminal with a SIM and used in a low-power consumption state, in association with a subscriber identifier included in the SIM, transmitting to the subscriber terminal a request for a detachment of the subscriber identifier, the detachment necessitating a reattachment, receiving a reattachment completion notification from the MNO via the subscriber information database, requesting, from the subscriber terminal, a third setting value of the parameter after reattachment, and determining, at least partially, a decision procedure of a value of the parameter in the MNO by using the first setting value, the second setting value, and the third setting value.

An information processing apparatus of a second aspect of the present disclosure is an information processing apparatus for managing configuration of a wireless communication service provided using a wireless communication infrastructure of an MNO, wherein the apparatus requests a subscriber information database to be configured to store a second setting value, which is different from a first setting value of a parameter stored in a subscriber terminal having a SIM and used in a low-power consumption state, in association with a subscriber identifier included in the SIM, the apparatus transmits a request for a detachment of the subscriber identifier, the detachment necessitating a reattachment, to the subscriber terminal, and receives a reattachment completion notification from the MNO via the subscriber information database, the apparatus requests, from the subscriber terminal, a third setting value of the parameter after reattachment, and the apparatus determines, at least partially, a decision procedure of a value of the parameter in the MNO by using the first setting value, the second setting value, and the third setting value.

A storage medium of a third aspect of the present disclosure is a non-transitory storage medium for storing a program for causing a server to execute an information processing method for managing configuration of a wireless communication service provided using a wireless communication infrastructure of an MNO. The information processing method includes the steps of requesting a subscriber information database to be configured to store a second setting value, which is different from a first setting value of a parameter stored in a subscriber terminal having a SIM and used in a low-power consumption state, in association with a subscriber identifier included in the SIM, transmitting to the subscriber terminal a request for a detachment of the subscriber identifier, the detachment necessitating a reattachment, receiving a reattachment completion notification from the MNO via the subscriber information database, requesting, from the subscriber terminal, a third setting value of the parameter after reattachment, and determining, at least partially, a decision procedure of a value of the parameter in the MNO by using the first setting value, the second setting value, and the third setting value.

DETAILED DESCRIPTION OF THE INVENTION

Hereinafter, the present disclosure will be described through exemplary embodiments of the present disclosure, but the following exemplary embodiments do not limit the claimed disclosure, nor are all of the combinations of features described in the exemplary embodiments are necessarily essential to the solution means of the disclosure.

Embodiments of the present disclosure will be described in detail below with reference to the drawings.

Figure 1:
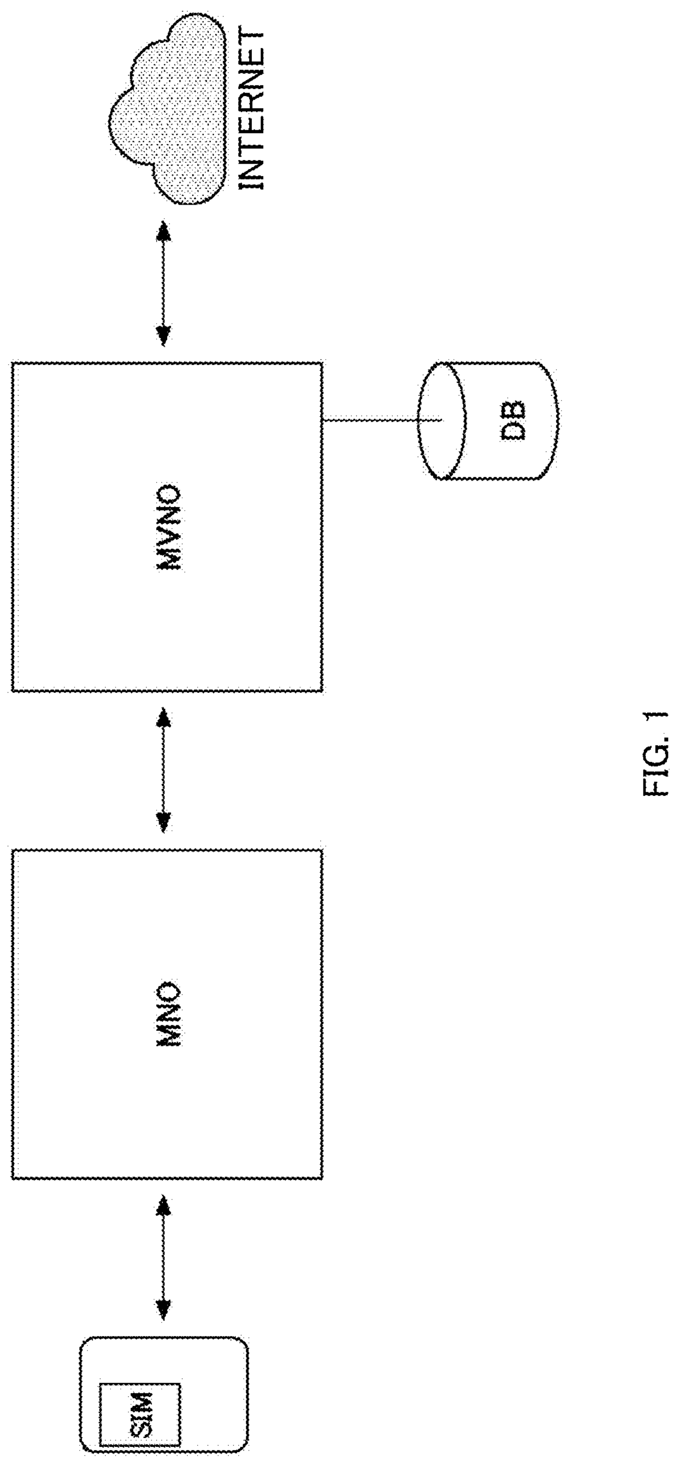
FIG. 1 illustrates an MVNO that provides a wireless communication service using a wireless communication infrastructure of an MNO.
Figure 2:
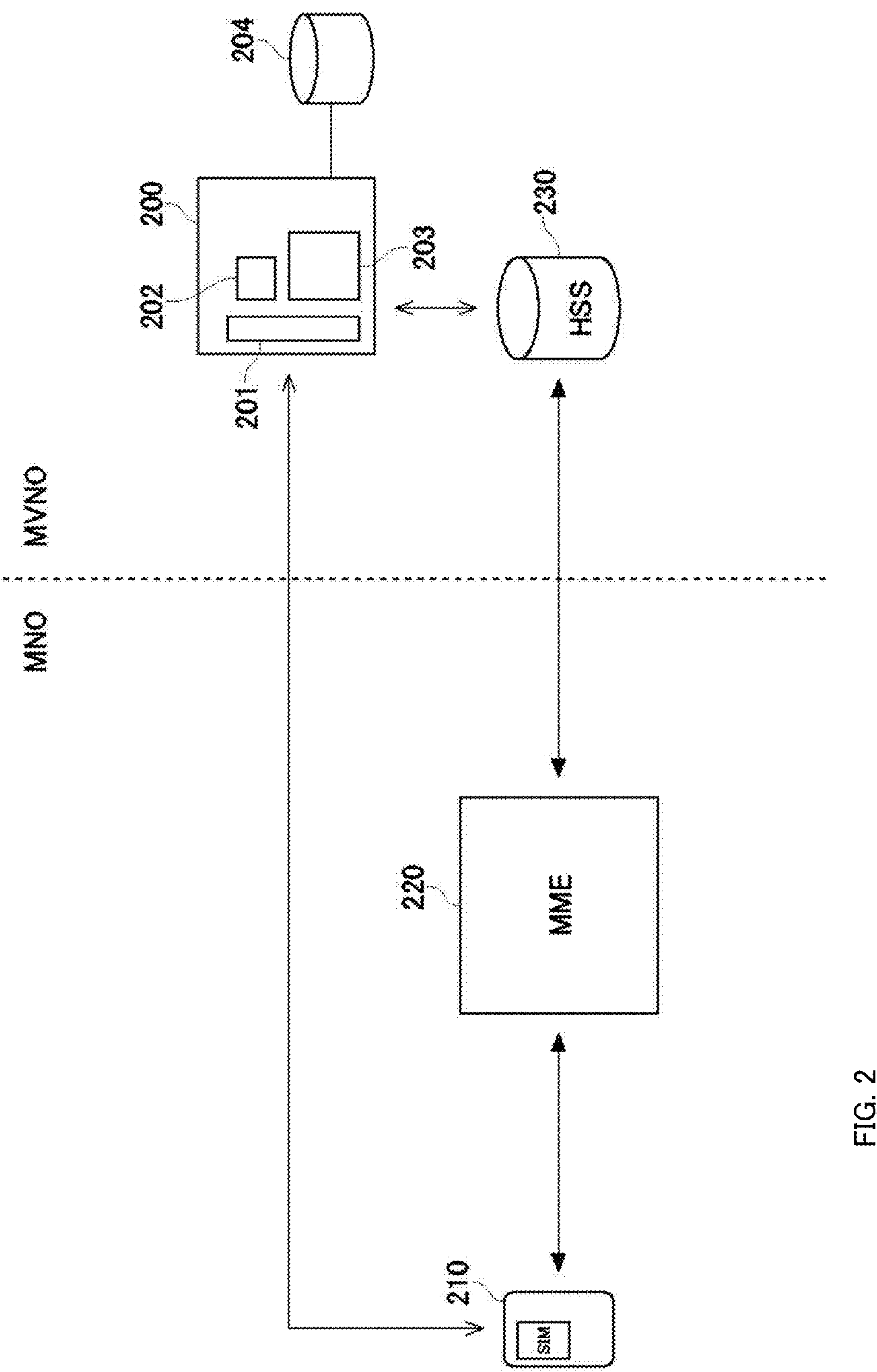
FIG. 2 shows a system according to an embodiment of the present disclosure.

FIG. 2 shows a system according to an embodiment of the present disclosure. An apparatus 200 included in the system is an information processing apparatus for managing configuration of a wireless communication service using a wireless communication infrastructure of an MNO, and can communicate with a subscriber terminal 210 having a SIM. The apparatus 200 is a computer, for example. Various methods of communication for the wireless communication service are possible, but one preferred example is communication using SMS.

In the subscriber terminal 210, it is sufficient to respond to a request described below from the apparatus 200 if a telephone number from which an SMS is sent is a predetermined number. Further, the subscriber terminal 210 communicates with the MME 220, which is a facility included in a wireless communication infrastructure of an MNO, in order to establish a communication connection via a cellular system such as cellular LPWA using its SIM. As used herein, a "system" includes at least some of a plurality of components shown in FIG. 2.

More specifically, the subscriber terminal 210 transmits an attach request to the MME 220, and the MME 220 having received the attach request makes a request called an Update Location Request (ULR), including a subscriber identifier such as an IMSI included in the attach request, to the HSS 230. The HSS 230 stores subscriber information and location information in association with the subscriber identifier, and the subscriber information may include setting values of one or more parameters used in a low-power consumption state.

An Update Location Answer (ULA) is transmitted from the HSS 230 to the MME 220 as a response to the ULR, and the ULA may include a setting value of at least some of the one or more parameters. The MME 220 having received the ULA transmits a notification, indicating that an attachment has been made, to the subscriber terminal 210. The notification includes the setting values of one or more parameters used in the low-power consumption state determined in the MME 220.

Although the current specification includes four kinds of parameters, the following description will focus on any one parameter for simplicity. Further, it is preferable that the apparatus 200 determines the decision procedure in the MNO using the management method according to the present embodiment for all parameters, but advantages of the present disclosure can be obtained even if the apparatus 200 infers the decision procedure for only some parameters (if the apparatus 200 makes a determination for at least a portion).

The attach request transmitted from the subscriber terminal 210 includes a setting value of a parameter used in a low-power consumption state. The MME 220 determines, in accordance with a policy for each MNO, a value to be set for the subscriber terminal 210 from among a value received from the subscriber terminal 210, a value received from the HSS 230, and a value preset in the MME 220.

The apparatus 200 can communicate with the HSS 230, for example, by being compliant with HTTP, and more specifically, using a REST API. The apparatus 200 and the HSS 230 are a facility of an MVNO or an MVNE that provides a wireless communication service using a wireless communication infrastructure of an MNO, for example. The apparatus 200 is one or more instances on a cloud or public cloud, for example. The HSS 230 may also be one or more instances on the same or different cloud or public cloud.

As used herein, a "cloud" refers to a system capable of dynamically provisioning computing resources such as CPUs, memory, storage, and network bandwidth, and providing these computing resources on a network according to demand. For example, a cloud can be used by AWS (registered trademark) or the like. Further, a "public cloud" refers to a cloud that can be used by a plurality of tenants.

The apparatus 200 includes a communication unit 201 such as a communication interface, a processing unit 202 such as a processor or a CPU, and a storage unit 203 including a storage device or a storage medium such as a memory or a hard disk, and executes a program for performing each process. The apparatus 200 may include one or more devices, computers, instances, or servers.

The program may include one or more programs, and may be recorded on a computer-readable storage medium as a non-transitory program product. The program can be stored in a storage device or a storage medium such as a database 204 accessible from the storage unit 203 or the apparatus 200 via an IP network, and can be executed by the processing unit 202. Data described below as being stored in storage unit 203 may be stored in the database 204 and vice versa.

In the above description, the technical terms “MME” and “HSS” that have thus far been used for 4G. For 5G, the former corresponds to “Access and Mobility management Function (AMF)” and the latter corresponds to “Unified Data Management (UDM)” and “Unified Data Repository (UDR).” Although the terms MME and HSS are used in the following description, the technical terminology is subject to change with developments in communication standards and does not exclude equivalent functions. MME is more generally referred to as “mobility management facility” and HSS is more generally referred to as “subscriber information database.”

Figure 3:
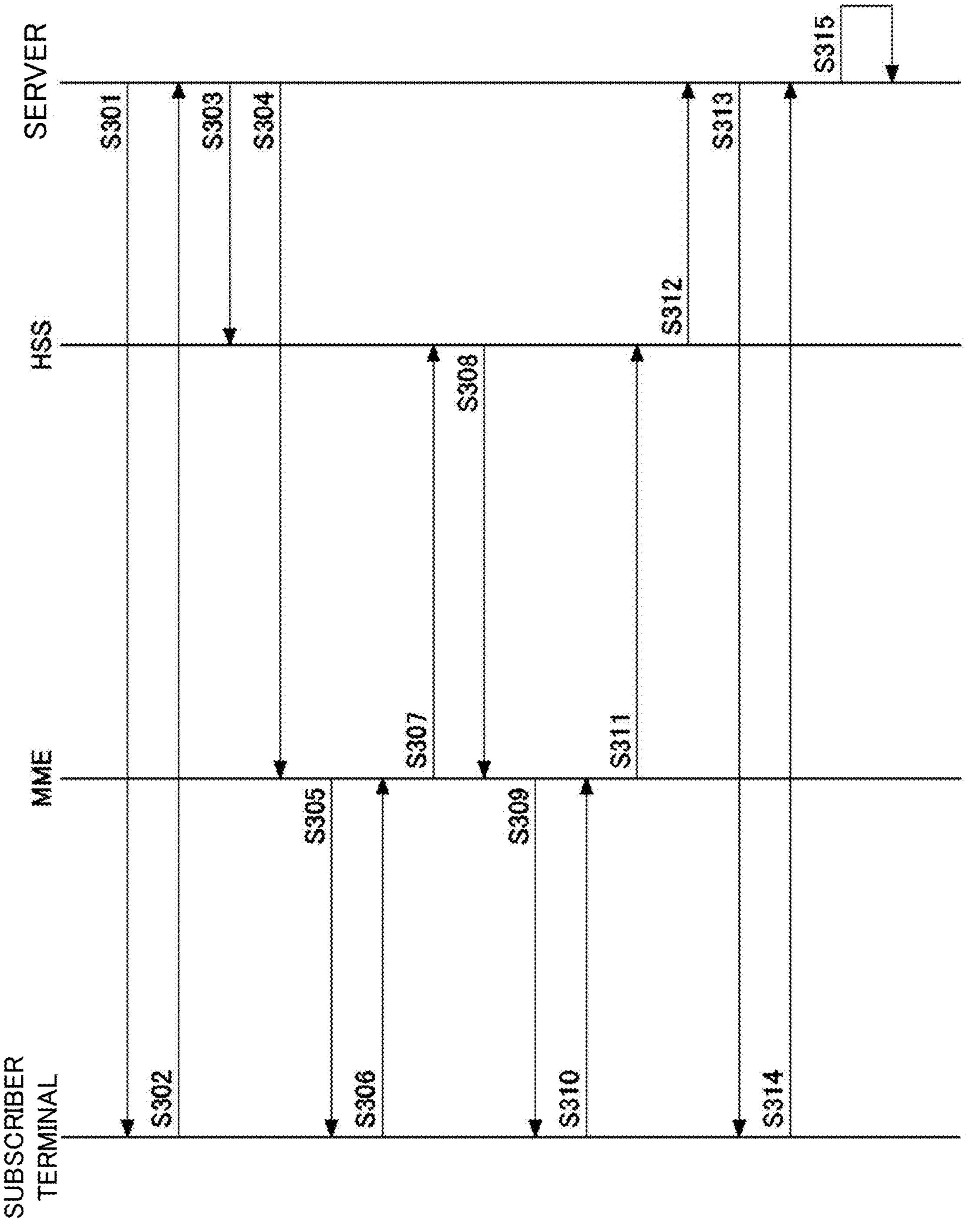
FIG. 3 is a flowchart showing a management method according to the embodiment of the present disclosure.

The processing flow in the apparatus 200 will be described below with reference to FIG. 3. FIG. 3 shows a management method according to the embodiment of the present disclosure. First, the apparatus 200 requests, from the subscriber terminal 210, a first setting value A of a parameter stored in the subscriber terminal 210 and used in the low-power consumption state (S301), and receives the first setting value A (S302). This step is not necessarily required if the apparatus 200 has already stored the first setting value A. The first setting value A can be obtained by executing an AT command in the subscriber terminal 210.

Next, the apparatus 200 transmits configuration request to the HSS 230 to store a second setting value B, different from the first setting value A, in association with the subscriber identifier contained in the SIM of the subscriber terminal 210, as the value of the parameter (S303). The HSS 230 may manage the subscriber identifier on a group basis, and may allow the value of the parameter to be maintained or changed on a group basis by specifying the group identifier.

The apparatus 200 then transmits a Cancel Location Request (CLR) for canceling location registration of a SIM identifier to the MME 220, which is a facility included in the wireless communication infrastructure of the MNO, via the HSS 230 (S304). The CLR includes a designation of a need for a reattachment after cancellation of the location registration. This designation may be given by setting a “Reattach-Required” bit of the CLR-Flag, for example. The cancellation of the location registration by the CLR deletes the subscriber information in addition to the location information. The MME 220 that has received the CLR transmits a detach request to the subscriber terminal 210 (S305). The detach request includes, on the basis of the designation included in the CLR, a designation of the need of a reattachment in the same manner.

The subscriber terminal 210 then transmits a reattach request to the MME 220 (S306), and the MME 220 transmits a ULR to the HSS 230 (S307). The HSS 230 returns a ULA to the MME 220 (S308), and the MME 220 transmits a notification, indicating that a reattachment has been made, to the subscriber terminal 210 (S309). This notification includes a third setting value C of the parameter determined by the MME 220. Then, the subscriber terminal 210 transmits a reattach completion notification to the apparatus 200 via the MME 220 and the HSS 230 (S310 to S312).

The apparatus 200, having received the reattach completion notification, requests from the subscriber terminal 210 the third setting value C of the parameter after reattachment (S313), and receives the third setting value C (S314). Then, the apparatus 200 uses the first setting value A, the second setting value B, and the third setting value C to determine the decision procedure of the value of the parameter in the MNO (S315). The apparatus 200 has access to a program capable of executing at least a portion of an algorithm for determining the decision procedure, as described below.

There are the following five patterns as a procedure for deciding the parameter value to be used in the low-power consumption state from among the first setting value A, the second setting value B, and the third setting value C. Here, UE represents the subscriber terminal 210, and the pattern varies depending on which of the setting values stored in the UE, the MME, and the HSS is given priority.

TABLE 1

| PATTERN | 1ST PRIORITY | 2ND PRIORITY | 3RD PRIORITY |
|---|---|---|---|
| 1 | MME | — | — |
| 2 | UE | MME | — |
| 3 | HSS | MME | MME |
| 4 | UE | HSS | MME |
| 5 | HSS | US | MME |

If the third setting value C is different from the first setting value A and the second setting value B, the apparatus 200 can determine that the MME 220 is employing a pattern 1. If the third setting value C is equal to the first setting value A, the apparatus 200 can determine that the MME 220 employs the pattern 1, a pattern 2, or a pattern 4. If the third setting value C is equal to the second setting value B, the apparatus 200 can determine that the MME 220 employs the pattern 1, a pattern 3, or a pattern 5.

If the first setting value A and the second setting value B are set to Null and a reattachment is performed, the third setting value C will be, in any pattern, a setting value preset for the parameter in the MME 220. If the preset value stored in the MME 220 or MNO is reset to a value that differs from the first setting value A and the second setting value B, then, in instances where the third setting value C is equal to the first setting value A, the apparatus 200 can determine that the MME 220 employs the pattern 2 or the pattern 4. Similarly, if the third setting value C is equal to the second setting value B, the apparatus 200 can determine that the MME 220 employs the pattern 3 or the pattern 5.

By further setting the first setting value A to Null when the third setting value C is equal to the first setting value A, the third setting value C will be either i) the value preset in the MNO or ii) the second setting value B, and the apparatus 200 can determine that the MME 220 employs the pattern 2 if the former and the pattern 4 if the latter. Similarly, by further setting the second setting value B to Null when the third setting value C is equal to the second setting value B, the third setting value C will be either i) the value preset in the MNO or ii) the first setting value A, and the apparatus 200 can determine that the MME 220 employs the pattern 3 if the former and the pattern 5 if the latter.

If the third setting value C is equal to the first setting value A when a reattachment with the first setting value A and the second setting value B set to Null is not performed beforehand, then the third setting value C will be either i) the value preset in the MNO or ii) the second setting value B by setting the first setting value A to Null, and the apparatus 200 can determine that MME 220 employs the pattern 1 or 2 if the former and the pattern 4 if the latter. Similarly, by setting the second setting value B to Null when the third setting value C is equal to the second setting value B, the third setting value C will be either i) the value preset in the MNO or ii) the first setting value A, and the apparatus 200 can determine that the MME 220 employs the pattern 1 or 3 if the former and the pattern 5 if the latter.

As described above, it is often not possible to fully determine which pattern is employed by simply setting the second setting value B, which differs from the first setting value A, and reattaching once, but by setting at least one of the first setting value A and the second setting value B to Null before or after the reattachment as necessary and reattaching, the apparatus 200 can determine the pattern.

In the 3GPP standard procedure, the HSS 230 is not informed of the setting value determined by the MME 220, and so the MVNO or the MVNE that provides the wireless communication service using the wireless communication infrastructure of the MNO does not know what setting value the subscriber terminal 210 is ultimately operating at, which may cause unexpected battery consumption or an unexpected failure. According to the method of the present embodiment, the apparatus 200 can determine the decision procedure of the setting value, and so the subscriber of the wireless communication service can perform more appropriate device management.

Figure 4:
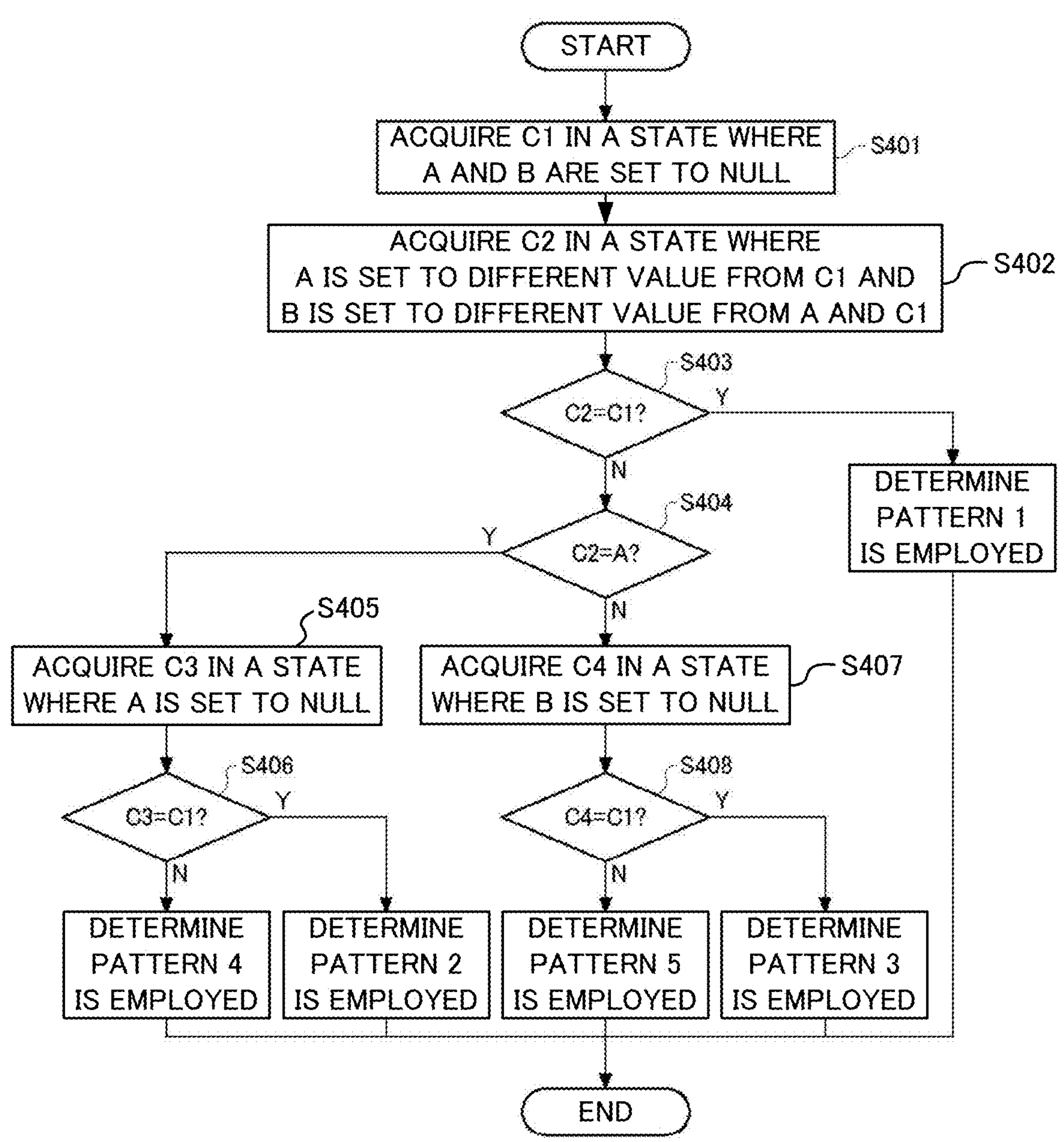
FIG. 4 shows an example of a determination of a decision procedure according to an embodiment of the present disclosure.

FIG. 4 shows an example of a determination of the decision procedure described above. First, the apparatus 200 acquires a third setting value C1 in a state where the first setting value A and the second setting value B are set to Null (S401). The value C1 acquired in this manner is the value preset by the MNO or the mobility management facility included in the communication infrastructure of the MNO. Then, the apparatus 200 further acquires a third setting value C2 in a state where the first setting value A is set to a value that differs from C1 and the second setting value B is set to a value that differs from the set first setting values A and C1 (S402). The apparatus 200 verifies whether or not C2 is equal to C1 (S403), and if C2 is equal to C1, determines that the pattern 1 is employed. If C2 is not equal to C1, the apparatus 200 further verifies whether or not C2 is equal to A (S404).

If C2 is equal to A, the apparatus 200 acquires a third setting value C3, which is a new third setting value, in a state where the first setting value A is set to Null (S405). Specifically, the apparatus 200 first transmits to the subscriber terminal 210 a request to set the first setting value A to Null. The apparatus 200 transmits to the subscriber terminal 210 a request for a detachment of the subscriber identifier, the detachment necessitating a reattachment. The apparatus 200 receives a reattach completion notification from the MNO via the subscriber information database. Subsequently, the apparatus 200 acquires the third setting value C3 by requesting a new third setting value of the parameter after reattachment.

The apparatus 200 uses the new third setting value to determine the decision procedure of the value of the parameter in the MNO. Depending on whether or not C3 is equal to C1 (S406), the pattern is determined to be the pattern 2 or the pattern 4. If C2 is not equal to A, the apparatus 200 acquires a third setting value C4 in a state where B is set to Null (S407).

Specifically, the apparatus 200 first transmits to the subscriber terminal 210 a request to set the second setting value B to Null. The apparatus 200 transmits to the subscriber terminal 210 the request for the detachment of the subscriber identifier, the detachment necessitating a reattachment. The apparatus 200 receives the reattach completion notification from the MNO via the subscriber information database. Subsequently, the apparatus 200 acquires the third setting value C4 by requesting a new third setting value of the parameter after reattachment. Depending on whether or not C4 is equal to C1 (S408), the pattern is determined to be the pattern 3 or the pattern 5.

If the apparatus 200 determines in which pattern the MME 220 decides the setting value, the apparatus 200 preferably stores an association between the MNO identifier and the pattern. Since a mobility management facility identifier, such as a host name of the MME 220, is included in an ULR, the apparatus 200 may store an association between the mobility management facility identifier and the pattern.

Although the MME 220 is illustrated as a single facility in FIG. 2, a plurality of MMEs may be included in the wireless communication infrastructure of the MNO. For example, the MMEs may be distributed in different regions to ensure geographical redundancy, or the MMEs may survive individually after a plurality of communication carriers are merged. Accordingly, the apparatus 200 preferably stores the pattern in association with both the MNO identifier and the mobility management facility identifier.

Since the pattern employed by the MNO may be changed without the MVNO or the MVNE being informed, the apparatus 200 preferably stores i) a date and time, such as a date and time when the pattern was determined and a date and time when the association was stored, together with ii) an association between the pattern and at least one of the MNO identifier and the mobility management facility identifier.

Further, it is assumed that the setting in the MNO may differ depending on a plan that the subscriber signed with the MVNO or the MVNE that provides the wireless communication service using the wireless communication infrastructure of the MNO. Accordingly, the apparatus 200 may further store i) a plan identifier for identifying the plan such as a plan name together with ii) the association between the pattern and at least one of the MNO identifier and the mobility management facility identifier. In this case, the MME 220 i) stores or has access to a range of subscriber identifiers subscribing to each plan, ii) selects a pattern according to the plan on the basis of the subscriber identifier included in the attach request from the subscriber terminal 210, and iii) determines values of one or more parameters used in the low-power consumption state according to that pattern.

It should be noted that roaming is not specifically mentioned in the above description, but the present disclosure is applicable in a similar manner even if the MME 220 is a mobility management facility of an MNO that is a roaming partner of an MVNO or an MVNE that issues a SIM for the subscriber terminal 210.

Further, as an alternative embodiment of the present disclosure, instead of the HSS 230 transmitting a CLR as a request for a detachment to the MME 220, the apparatus 200 may transmit a bearer deletion request, called "Delete Bearer Request," to a PGW (not shown in figures) connected to a communication infrastructure of an MNO to cause the MME 220 to transmit a detach request to the subscriber terminal 210 via the PGW.

After receiving the bearer deletion request, the PGW transmits the bearer deletion request to the MME 220 via the SGW (not shown in figures) included in the communication infrastructure of the MNO, and the MME 220 transmits a detach request to the subscriber terminal 210. The bearer deletion request includes a designation of the need for reattachment after the bearer deletion. This designation may be given by setting a Cause value "Reactivation Requested," for example. In addition, the detach request includes, on the basis of the designation included in the bearer deletion request, a designation of the need of a reattachment in the same manner. Thus, the request for detaching the subscriber identifier need only be transmitted to the subscriber terminal 210, and is not necessarily transmitted directly to the MME 220.

In the above description, the technical terms for 4G "SGW" and "PGW" are used, and "an SGW" and "a PGW" have both "a function on the C-plane" and "a function on the U-plane." More generally, the function on the C-plane of an SGW is called "a gateway on the C-plane included in a communication infrastructure of an MNO" and the function on the U-plane is called "a gateway on the U-plane included in a communication infrastructure of an MNO." The function on the C-plane of a PGW is called "a gateway on the C-plane connected to a communication infrastructure of an MNO," and the function on the U-plane is called "a gateway on the U-plane connected to a communication infrastructure of an MNO." A PGW corresponds to a facility included in a communication infrastructure of an MVNO or an MVNE. Control and User Plane Separation (CUPS) may be applied to an SGW and a PGW to separately arrange the gateway on the C-plane from the gateway on the U-plane. In 5G, "a gateway on the C-plane" corresponds to "Session Management Function (SMF)," and "a gateway on the U-plane" corresponds to "User Plane Function (UPF)."

It should be noted that in the embodiments described above, it is assumed that additional information can also be taken into account herein unless the word "only" is mentioned, such as "based only on xx," "according to xx only" or "for xx only." Further, as an example, it is to be noted that the statement "b in case a" does not necessarily mean "always b in case a" or "b immediately after a" unless explicitly stated. Furthermore, the phrase "each a comprising A" does not necessarily mean that A is composed of a plurality of components, and includes the fact that A is composed of a single component.

The present disclosure has been described above on the basis of the exemplary embodiments. The technical scope of the present disclosure is not limited to the scope of the embodiments described above, and it is obvious to those skilled in the art that various changes and modifications to the embodiment within the scope of the disclosure may be made. It shall be clear from the description of the claims that such changes and modifications can be included in the technical scope of the present disclosure.

What is claimed is:

1. An information processing method, executed by a server, for managing configuration of a wireless communication service provided using a wireless communication infrastructure of an MNO, the method comprising the steps of:

requesting a subscriber information database to be configured to store a second setting value, which is different from a first setting value of a parameter stored in a subscriber terminal with a SIM and used in a low-power consumption state, in association with a subscriber identifier included in the SIM;

transmitting to the subscriber terminal a request for a detachment of the subscriber identifier, the detachment necessitating a reattachment;

receiving a reattachment completion notification from the MNO via the subscriber information database;

requesting, from the subscriber terminal, a third setting value of the parameter after reattachment; and determining, at least partially, a decision procedure of a value of the parameter in the MNO by using the first setting value, the second setting value, and the third setting value.

2. The information processing method according to claim 1, further comprising the step of:

requesting and receiving, by the server, the first setting value from the subscriber terminal.

3. The information processing method according to claim 1, wherein the first setting value and the second setting value are different from a setting value preset for the parameter in the MNO.

4. The information processing method according to claim 3, further comprising the steps, before the requesting the subscriber terminal to be configured, of:

transmitting to the subscriber terminal a request to set the first setting value to Null;

transmitting to the subscriber information database a request to set the second setting value to Null;

transmitting to the subscriber terminal a request for a detachment of the subscriber identifier, the detachment necessitating a reattachment;

receiving a reattachment completion notification from the MNO via the subscriber information database;

requesting a setting value of the parameter after reattachment to the subscriber terminal; and storing the setting value as a setting value preset for the parameter in the MNO.

5. The information processing method according to claim 4, further comprising the step of:

transmitting to the subscriber terminal a request to reset the first setting value to a value different from a setting value preset for the parameter.

6. The information processing method according to claim 1 comprising the steps, executed by the server after the requesting the third setting value when the third setting value is equal to the first setting value, of:

transmitting to the subscriber terminal a request to set the first setting value to Null;

transmitting to the subscriber terminal a request for a detachment of the subscriber identifier, the detachment necessitating a reattachment;

receiving a reattachment completion notification from the MNO via the subscriber information database;

requesting, from the subscriber terminal, a new third setting value of the parameter after reattachment; and further determining a decision procedure of a value of the parameter in the MNO by using the new third setting value.

7. The information processing method according to claim 1 comprising the steps, executed by the server after requesting the third setting value when the third setting value is equal to the second setting value, of:

transmitting to the subscriber information database a request to set the second setting value to Null;

transmitting to the subscriber terminal a request for a detachment of the subscriber identifier, the detachment necessitating a reattachment;

receiving a reattachment completion notification from the MNO via the subscriber information database;

requesting, from the subscriber terminal, a new third setting value of the parameter after reattachment; and further determining a decision procedure of a value of the parameter in the MNO by using the new third setting value.

8. The information processing method according to claim 1, further comprising the step of:

storing an association between i) a pattern of the determined decision procedure and ii) at least one of an MNO identifier for identifying the MNO and a mobility management facility identifier for identifying a mobility management facility for deciding the parameter in the MNO.

9. An information processing apparatus for managing configuration of a wireless communication service provided using a wireless communication infrastructure of an MNO, wherein the apparatus requests a subscriber information database to be configured to store a second setting value, which is different from a first setting value of a parameter stored in a subscriber terminal having a SIM and used in a low-power consumption state, in association with a subscriber identifier included in the SIM, the apparatus transmits a request for a detachment of the subscriber identifier, the detachment necessitating a reattachment, to the subscriber terminal, and receives a reattachment completion notification from the MNO via the subscriber information database, the apparatus requests, from the subscriber terminal, a third setting value of the parameter after reattachment, and the apparatus determines, at least partially, a decision procedure of a value of the parameter in the MNO by using the first setting value, the second setting value, and the third setting value.

10. A non-transitory storage medium for storing a program for causing a server to execute an information processing method for managing configuration of a wireless communication service provided using a wireless communication infrastructure of an MNO, the information processing method comprising the steps of:

requesting a subscriber information database to be configured to store a second setting value, which is different from a first setting value of a parameter stored in a subscriber terminal having a SIM and used in a low-power consumption state, in association with a subscriber identifier included in the SIM;

transmitting to the subscriber terminal a request for a detachment of the subscriber identifier, the detachment necessitating a reattachment;

receiving a reattachment completion notification from the MNO via the subscriber information database;

requesting, from the subscriber terminal, a third setting value of the parameter after reattachment; and determining, at least partially, a decision procedure of a value of the parameter in the MNO by using the first setting value, the second setting value, and the third setting value.

* * * * *